United States Patent [19]

Kitahata et al.

[11] Patent Number: 4,851,276
[45] Date of Patent: Jul. 25, 1989

[54] MAGNETIC RECORDING MEDIUM AND METHOD FOR PRODUCING THE SAME

[75] Inventors: Shinichi Kitahata; Mikio Kishimoto, both of Osaka, Japan

[73] Assignee: Hitachi Maxell, Ltd., Osaka, Japan

[21] Appl. No.: 22,727

[22] Filed: Mar. 6, 1987

[30] Foreign Application Priority Data

Mar. 7, 1986 [JP] Japan .................................. 61-50003

[51] Int. Cl.$^4$ .............................................. G11B 5/74
[52] U.S. Cl. .................................... 428/141; 427/130; 427/131; 428/323; 428/328; 428/329; 428/694; 428/900
[58] Field of Search ............... 428/694, 900, 323, 329, 428/328, 141; 427/130, 131

[56] References Cited

U.S. PATENT DOCUMENTS

| 4,482,578 | 11/1984 | Akashi et al. | 427/130 |
| 4,508,752 | 4/1985 | Takei et al. | 427/130 |
| 4,547,393 | 10/1985 | Asai et al. | 427/130 |
| 4,672,009 | 6/1987 | Takahashi et al. | 427/128 |
| 4,678,682 | 7/1987 | Asai et al. | 427/128 |

Primary Examiner—Paul J. Thibodeau
Attorney, Agent, or Firm—Birch, Stewart, Kolasch & Birch

[57] ABSTRACT

A magnetic recording medium comprising a substrate and a magnetic layer formed on at least one surface of the substrate, wherein magnetic powder in the magnetic layer has a degree of orientation of magnetic easy axis of the magnetization in a direction perpendicular to the magnetic layer of 0.60 or higher when measured by the Mössbauer method, has good surface smoothness, has good electromagnetic conversion properties, and is suitable for high density recording.

23 Claims, 2 Drawing Sheets

MAGNETIC RECORDING MEDIUM AND METHOD FOR PRODUCING THE SAME

BACKGROUND OF THE INVENTION

1. Field of the Invention

The present invention relates to a magnetic recording medium and a method for producing the same. More particularly, it relates to a magnetic recording medium which comprises a magnetic layer with improved surface smoothness, which has good electromagnetic conversion properties and is suitable for high density recording.

2. Description of the Prior Arts

Generally, magnetic properties of a magnetic recording medium are improved, for example, by orienting acicular magnetic powder having a magnetic axis of easy magnetization in the longer axis of the acicular particles along a longitudinal direction of the magnetic layer. However, in a magnetic recording medium which utilizes magnetic components in the longitudinal direction of the magnetic layer, an increase of the recording density has its limit. That is, as the recording density increases, the strength of a demagnetizing field in the magnetic layer increases so that remnant magnetization decreases and rotates, whereby detection of the recorded signals becomes difficult.

In a perpendicular magnetic recording system which utilizes a magnetic component perpendicular to the plane of the magnetic layer, the strength of the demagnetizing field decreases as the recording density increases, so that such a recording system is recognized to be suitable for high density recording. It is proposed to utilize hexagonal system ferrite magnetic powder or acicular magnetic powder and to orient its magnetic axis of easy magnetization in a direction perpendicular to the magnetic layer by applying a homogeneous magnetic field perpendicular to the magnetic layer by an N-S opposed type magnet and to vertically record signals by utilizing the perpendicular magnetic component of the magnetic medium (cf. Japanese Patent Kokai Publication No. 86103/1980). The magnetic recording medium produced by such method has a squareness ratio of up to 0.9 in the direction perpendicular to the magnetic layer, when the demagnetizing field which has influences on the properties of the magnetic recording medium in the perpendicular direction to the magnetic layer is compensated on a hysteresis curve measured by a sample vibrating type fluxmeter. However, when the squareness ratio exceeds 0.7, the magnetic recording medium produced by the above method does not show such a tendency that reproducing output of the magnetic recording medium and $D_{50}$ at which reproducing output decreases to a half increase in proportion to the increase of the squareness ratio as found in the range of 0.7 or less of the squareness ratio. According to this method, when the squareness ratio exceeds 0.7, the increase of the recording output and $D_{50}$ cannot be correctly measured. Therefore, the squareness ratio of 0.9 found by this measuring method does not necessarily mean that the squareness ratio of 0.9 in the vertical direction is sufficiently high. Then, the magnetic particles could not be sufficiently oriented in the direction perpendicular to the magnetic layer, and the magnetic recording medium could not be suitable for high density recording.

SUMMARY OF THE INVENTION

One object of the present invention is to provide a magnetic recording medium comprising a magnetic layer having improved surface smoothness.

Another object of the present invention is to provide a magnetic recording medium which has an improved electromagnetic conversion property and is suitable for high density recording.

A further object of the present invention is to provide a magnetic recording medium comprising a magnetic layer having a large degree of orientation of the magnetic axis of easy magnetization in a direction perpendicular to the magnetic layer.

Yet another object of the present invention is to provide a method for producing such a magnetic recording medium.

DETAILED DESCRIPTION OF THE INVENTION

The present invention has been completed based on the finding that, when a vertically oriented magnetic field having a larger gradient on the side of the substrate of the magnetic recording medium is applied during the coating of a magnetic paint containing magnetic powder on the substrate and the drying of the coated paint, orientation of the magnetic axis of easy magnetization in a direction perpendicular to the magnetic layer can be increased to 0.60 or higher when measured by the Mossbauer method, the squareness ratio in a direction perpendicular to the magnetic layer can be increased to higher than 0.9 which has been obtained by compensating the demagnetizing field on a hysteresis curve measured by a sample vibrating type. Further, the surface smoothness of the magnetic layer is improved so that the magnetic recording medium becomes more suitable for high density recording.

Figure 1:
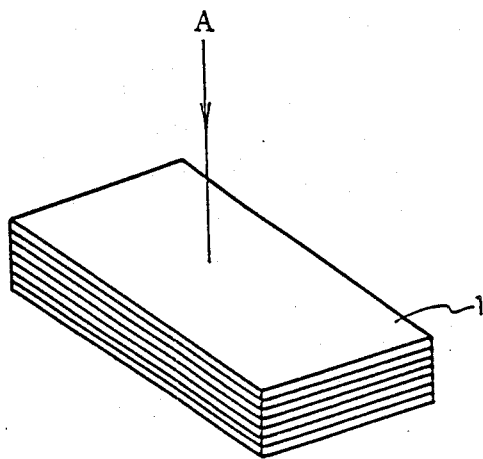
FIG. 1 schematically shows the Mossbauer method for measuring the degree of orientation of the magnetic axis of easy magnetization of a magnetic recording medium.
Figure 2:
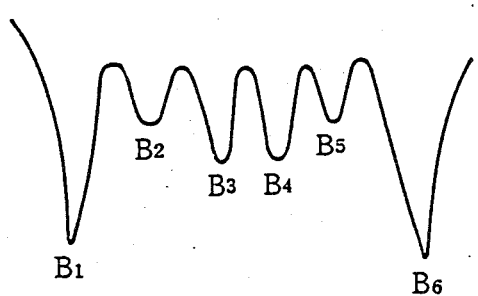
FIG. 2 is a graph schematically showing a spectrum obtained by the Mossbauer method, FIG. 3 schematically shows a method for producing a magnetic recording medium according to the present invention.

According to the present invention, the degree of orientation of the magnetic axis of easy magnetization in the direction perpendicular to the magnetic layer is measured by the Mössbauer method as follows:

As shown in FIG. 1, pieces of the magnetic recording medium 1 which have been demagnetized by alternate magnetic field are piled and irradiated by gamma rays in a direction perpendicular to the plane of the piled magnetic recording medium as shown by the arrow A to obtain a spectrum as shown in FIG. 2 having peaks $B_1$ to $B_6$. From the ratios of strength of the peaks $B_1$ to $B_6$, an average angle $\theta_z$ between the directions of the irradiated gamma rays and the magnetic moment in the magnetic powder is calculated according to the following equation:

$$\theta_z = \sin^{-1}\left[\frac{3/2(B_{2,5}/B_{1,6})}{1 + 3/4(B_{2,5}/B_{1,6})}\right]^{1/2}$$

The degree of orientation of the magnetic axis of easy magnetization in the perpendicular direction is defined as $\cos\theta_z$.

$\cos\theta_z$ has proportional relationships with the reproducing output and $D_{50}$, and shows a smaller value than the value of the squareness ratio obtained by compensating the demagnetizing field on a hysteresis curve measured by the sample vibrating type fluxmeter. A squareness ratio of 0.9 measured by the latter method approximately corresponds to $\cos\theta_z$ of 0.6. Therefore, a value of $\cos\theta_z$ larger than 0.6 means that the squareness ratio in the perpendicular direction is larger than 0.9 of the squareness ratio obtained by compensating the demagnetizing field on the hysteresis curve measured by the sample vibrating type fluxmeter. When the orientation degree $\cos\theta_z$ is larger than 0.6, the reproducing output and $D_{50}$ increase in proportion to $\cos\theta_z$.

Since, by the Mössbauer method, the orientation degree of the magnetic axis of easy magnetization can be measured in the demagnetized state of the magnetic recording medium with no demagnetizing field, it is not necessary to compensate the demagnetizing field, and further the obtained value of the orientation degree does not depend on the kind of the magnetic powder and/or a the shape of the magnetic layer. Therefore, a correct degree of orientation of magnetic easy axis of magnetization of the magnetic powder is measured.

The magnetic recording medium of the present invention has an orientation degree of the magnetic axis of easy magnetization of magnetic powder, $\cos\theta_z$, larger than 0.6 in the direction perpendicular to the magnetic layer. When $\cos\theta_z$ is larger than 0.6, the magnetic axis of easy magnetization of the magnetic powder is sufficiently oriented in the direction perpendicular to the magnetic layer, whereby sufficiently high density recording can be carried out by the magnetic recording medium of the present invention.

Such an orientation of the magnetic axis of easy magnetization can be obtained by applying a vertically oriented magnetic field having a larger gradient on the side of the substrate of the magnetic recording medium during the coating of the magnetic paint on the substrate and the drying of it. By the application of such a magnetic field, the magnetic powder is attracted to the substrate side by magnetic attracting force, so that disturbance of the orientation of the magnetic powder particles is effectively suppressed during evaporation of a solvent contained in the magnetic paint. Thereby, the magnetic axis of easy magnetization of the magnetic powder can be sufficiently oriented in the direction perpendicular to the magnetic layer so that the orientation degree of magnetic easy axis of easy magnetization $\cos\theta_z$ is increased to higher than 0.60 and the packing density of the magnetic powder is increased. By the suppression of the disturbance of orientation of the magnetic powder particles, the surface smoothness of the magnetic layer is improved.

As described in the above, according to the present invention, the orientation degree $\cos\theta_z$ of the magnetic easy of easy magnetization of the magnetic powder in the direction prependicular to the magnetic layer is larger than 0.60, preferably larger than 0.65. The surface roughness of the magnetic layer can be 0.03 $\mu$m or less in terms of center line average height, when the orientation degree $\cos\theta_z$ is larger than 0.60. When the surface roughness is worse than the above value, the magnetic recording medium cannot be used satisfactorily for high density recording.

Figure 3:
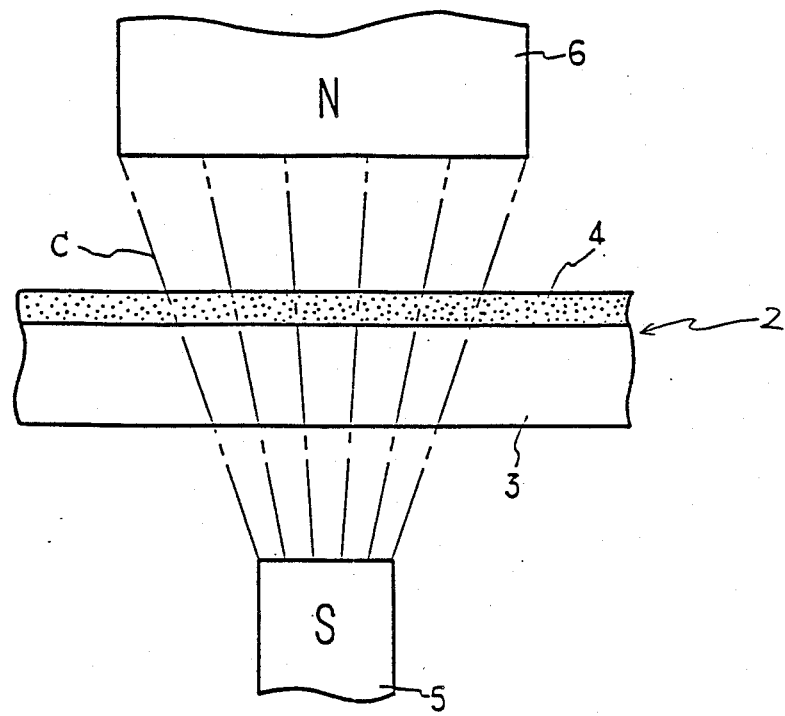

In the orientation of the magnetic powder in the direction perpendicular to the magnetic layer during coating and drying of the magnetic paint, the oriented magnetic field can be produced by providing an N-S opposed type magnet or an N-S opposed type electromagnet utilizing a solenoid near a coater which is used to coat the magnetic paint, or by magnetizing the coater itself and providing an opposing magnet near the magnetized coater to generate a magnetic field perpendicular to the plane of the magnetic layer. In either case, the S-pole 5 of the magnet is preferably provided on the side of the substrate 3 of the magnetic recording medium 2 as shown in FIG. 3 so that the area of the S-pole, which gives lines of magnetic force C, is made smaller than the area of the N-pole 6 of the magnet which is provided on the side of the magnetic layer 4 of the magnetic recording medium. Thereby, by using the N-S opposed type magnet 5 and 6, the lines of the magnetic force C having a large gradient are generated. The magnetic field intensity of such a magnetic force having a larger gradient on the substrate side of the magnetic recording medium is usually about three times larger than the coercive force of the magnetic layer and is from 3,000 to 4,000 Oe. The gradient of the magnetic field on the substrate side is preferably 500 Oe/cm or larger. When the magnetic field intensity and/or the gradient of the magnetic field on the substrate side are smaller than the above lower limits, the disturbance of the orientation of the magnetic powder is not effectively suppressed or the surface of the magnetic layer is not sufficiently smooth, so that the orientation of magnetic axis of easy magnetization of the magnetic powder cannot be made larger than 0.60, or the surface roughness cannot be made smaller than 0.03 $\mu$m in terms of center line average height. Thus, the produced magnetic recording medium is not suitable for high density recording.

The magnetic paint coated in such magnetic field as described above should be dried in the same magnetic field. Otherwise, the disturbance of orientation of the magnetic powder due to evaporation of the solvent cannot be effectively suppressed and the surface of the magnetic layer becomes rough. The drying of the magnetic paint may be carried out by blowing hot gas in the magnetic field or providing an infrared heater in the magnetic field.

The magnetic paint is prepared by a conventional method, for example, by mixing the magnetic powder, a binder resin and an organic solvent and other necessary components such as a dispersing agent, a lubricant, an abrasive, an antistatic agent and the like.

The magnetic powder is selected from magnetic powder which is conventionally used for the production of a magnetic recording medium for vertical recording. Examples of the magnetic powder are hexagonal system ferrite powder such as barium ferrite, acicular $\gamma$-$Fe_2O_3$ powder and acicular cobalt-containing $\gamma$-$Fe_2O_3$ powder.

The binder resin is widely selected from conventionally used resins such as vinyl chloride-vinyl acetate copolymers, polyvinyl butyral resins, cellulose type resins, polyurethane resins, isocyanate compounds, and radiation curable resins.

Specific examples of the organic solvent are toluene, methyl ethyl detone, methyl isobutyl ketone, cyclohexanone, tetrahydrofuran, ethyl acetate and mixtures thereof.

To decrease noise caused by static electricity, an undercoat layer having small electric resistance can be formed between the substrate and the magnetic layer. Further, to improve the recording/reproducing property of the magnetic recording medium, a layer having high magnetic permeability can be formed between the substrate and the magnetic layer.

The present invention will be explained in detail by the following examples wherein parts are by weight unless otherwise indicated.

EXAMPLE 1

To prepare a magnetic paint, barium ferrite magnetic powder having coercive force of 750 Oe and saturation magnetization of 52 emu/g was mixed with the following components in the following amounts by a ball mill for 3 days:

| Component | Parts |
| --- | --- |
| Ba ferrite magnetic powder | 1,000 |
| Vinyl chloride-vinyl acetate-vinyl alcohol copolymer (Trade name "VAGH" by U.C.C.) | 137.5 |
| Polyurethane resin (Trade name "Pandex T 5201" by Dainippon Ink Chemical Industry) | 87.5 |
| Low molecular weight trifunctional isocyanate (Trade name "Colonate L" by Nippon Urethane Industry) | 25 |
| $Cr_2O_3$ powder | 15 |
| Lauric acid | 20 |
| Liquid parafin | 2 |
| Methyl isobutyl ketone | 800 |
| Toluene | 800 |

When the magnetic paint was coated on both surfaces of a polyester base film having a thickness of 36 μm, a magnetic field of 1,000 Oe generated by a solenoid was acted on a coater and immediately thereafter the paint was coated along with applying a vertical magnetic field having a gradient of 2,000 Oe/cm and then air heated at 80° C. was blown in the magnetic field having the gradient to dry the coated paint to form a magnetic layer having a thickness of 1.0 μm. After the film having the magnetic layers was subjected to a treatment for smoothening the surfaces, it was struck to form a magnetic disc.

EXAMPLE 2

A magnetic disc was produced in the same manner as in Example 1 but applying a perpendicular magnetic field having a gradient of 1,000 Oe/cm instead of 2,000 Oe/cm, was applied.

COMPARATIVE EXAMPLE 1

A magnetic disc was produced in the same manner as in Example 1 but applying a vertical magnetic field, was applied.

COMPARATIVE EXAMPLE 2

A magnetic disc was produced the same manner as in Example 1 but no vertical magnetic field, was applied.

In the magnetic discs produced in Examples and Comparative Examples, the coercive force and the degree of orientation of the magnetic axis of easy magnetization of the magnetic powder in a direction perpendicular to the magnetic layer were measured. Also, the surface roughness of the magnetic layer was measured. Further, the maximum output level was measured at various recording wavelengths. The degree of orientation of magnetic axis of easy magnetization was measured by the Mössbauer method. The surface roughness in terms of center line average height was measured by a tracer type surface roughness meter with a cut off of 0.8 mm.

The results are shown in following Table.

TABLE

| Example No. | 1 | 2 | Comp. 1 | Comp. 2 |
| --- | --- | --- | --- | --- |
| Coercive force (Oe) | 920 | 880 | 800 | 760 |
| Degree of orientation | 0.80 | 0.75 | 0.58 | 0.52 |
| Max. output level at wavelength of | | | | |
| 1 μm | +0.3 | +0.3 | 0 | −3.0 |
| 0.75 μm | +0.7 | +0.6 | 0 | −4.0 |
| 0.5 μm | +1.5 | +1.2 | 0 | −6.0 |
| Surface roughness (μm) | 0.01 | 0.02 | 0.06 | 0.12 |

As is apparent from the results in Table, the magnetic disc produced in Comparative Example 2 in which no oriented magnetic field was applied had a large surface roughness and a low orientation of the magnetic easy axis of magnetization so that the maximum output level was low at all wavelengths. Although the magnetic disc produced in Comparative Example 1 had a good degree of orientation of the magnetic powder, the magnetic layer had a large surface roughness so that the maximum output level was low because the magnetic field applied to the disc had no gradient in the vertical direction to the magnetic layer. On the contrary, the magnetic discs of the present invention produced in Examples 1 and 2 had a large coercive force and degree of orientation of the magnetic easy axis of magnetization in the direction perpendicular to the magnetic layer and a small surface roughness so that the maximum output level was high at all wavelengths. This means that the magnetic recording medium of the present invention has a magnetic layer with smooth surface and good electromagnetic conversion properties so that it is suitable for high density recording.

What is claimed is:

1. A magnetic recording medium comprising:
   a substrate and
   magnetic layer formed on at least one surface of said substrate, wherein said magnetic layer comprises magnetic powder which has a degree of orientation of the magnetic axis of easy magnetization in a direction perpendicular to said magnetic layer in an amount of 0.60 or higher when measured by the Mössbauer method, and wherein the surface roughness of said magnetic layer is 0.03 microns or less.

2. The magnetic recording medium according to claim 1, wherein said magnetic powder comprises a hexagonal system of ferrite powder.

3. The magnetic recording medium according to claim 1, wherein said magnetic powder comprises acicular magnetic powder.

4. The magnetic recording medium according to claim 2, wherein said magnetic powder comprises acicular magnetic powder.

5. The magnetic recording medium according to claim 1, wherein said degree of orientation is an amount larger than 0.65.

6. The magnetic recording medium according to claim 3, wherein said magnetic powder comprises a hexagonal system of ferrite powder.

7. The magnetic recording medium according to claim 6, wherein said magnetic powder comprises barium ferrite, acicular gamma-$Fe_2O_3$, or acicular cobalt-containing gamma-$Fe_2O_3$.

8. The magnetic recording medium according to claim 1, further comprising an undercoat layer for decreasing noise having low electrical resistance which is formed between said substrate and said magnetic layer.

9. The magnetic recording medium according to claim 1, further comprising a permeable layer for improving the recording and reproducing properties of said magnetic recording medium, wherein said permeable layer has high magnetic permeability and is formed between said substrate and said magnetic layer.

10. The magnetic recording medium according to claim 1, wherein said magnetic layer is formed on one surface of said substrate.

11. The magnetic recording medium according to claim 1, wherein said degree of orientation is an amount of from 0.75 to 0.80.

12. The magnetic recording medium according to claim 11, wherein the surface roughness of said magnetic layer is from 0.01 to 0.02 microns.

13. The magnetic recording medium according to claim 3, wherein said magnetic powder comprises acicular magnetic powder.

14. The magnetic recording medium according to claim 12, wherein said magnetic powder comprises acicular magnetic powder.

15. A method for producing a magnetic recording medium comprising the steps of:
coating a layer of magnetic paint which contains magnetic powder on to a substrate in a magnetic field, wherein said magnetic field is perpendicular to the plane of said substrate and the magnetic field gradient is larger on the inner surface side of said magnetic paint layer adjacent said substrate than on the outer surface side of said magnetic paint layer, said larger gradient being at least 500 Oe/cm, and
drying said magnetic paint in said magnetic field so as to form a magnetic layer and so as to increase the degree of orientation of the magnetic axis of easy magnetization in a direction perpendicular to said magnetic layer to an amount of 0.60 or higher when measured by the Mössbauer method, wherein the surface roughness of said magnetic layer is 0.03 microns or less.

16. The method according to claim 15, wherein the intensity of said magnetic field is about three times larger than the coercive force of said magnetic layer.

17. The method according to claim 16, wherein the intensity of said magnetic field is from 3,000 to 4,000 Oe.

18. The method of claim 15, wherein said magnetic recording medium produced comprises magnetic powder of a hexagonal system of ferrite powder.

19. The method of claim 1, wherein the magnetic layer of axis magnetic recording medium produced has a degree of orientation in an amount larger than 0.65.

20. The method according to claim 15, further comprising forming an undercoat layer for decreasing noise which has low electrical resistance between said substrate and said magnetic layer.

21. The method according to claim 15, further comprising forming a permeable layer between said substrate and said magnetic layer, for improving the recording and reproducing properties of said magnetic recording medium, wherein said permeable layer has high magnetic permeability.

22. The method of claim 15, wherein the magnetic layer of said magnetic recording medium produced has a degree of orientation in an amount of from 0.75 to 0.80.

23. The method of claim 22, wherein the surface roughness of said magnetic layer is from 0.01 to 0.02 microns.

* * * * *